United States Patent
Izadi et al.

(10) Patent No.: US 9,552,036 B2
(45) Date of Patent: Jan. 24, 2017

(54) INFORMATION TRANSMISSION BASED ON MODAL CHANGE

(71) Applicant: Microsoft Technology Licensing, LLC., Redmond, WA (US)

(72) Inventors: Shahram Izadi, Cambridge (GB); Behrooz Chitsaz, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 129 days.

(21) Appl. No.: 14/551,995

(22) Filed: Nov. 24, 2014

(65) Prior Publication Data

US 2015/0082068 A1    Mar. 19, 2015

Related U.S. Application Data

(63) Continuation of application No. 12/720,514, filed on Mar. 9, 2010, now Pat. No. 8,898,398.

(51) Int. Cl.
| | | |
|---|---|---|
| *G06F 12/00* | (2006.01) | |
| *G06F 13/00* | (2006.01) | |
| *G06F 1/32* | (2006.01) | |
| *G06F 1/16* | (2006.01) | |
| *G06F 12/08* | (2016.01) | |
| *G06F 17/24* | (2006.01) | |

(52) U.S. Cl.
CPC .......... *G06F 1/3203* (2013.01); *G06F 1/1626* (2013.01); *G06F 1/1647* (2013.01); *G06F 1/3293* (2013.01); *G06F 12/0811* (2013.01); *G06F 17/241* (2013.01); *G06F 2200/1637* (2013.01); *Y02B 60/121* (2013.01)

(58) Field of Classification Search
None
See application file for complete search history.

(56) References Cited

U.S. PATENT DOCUMENTS

| | | | |
|---|---|---|---|
| 6,631,474 B1* | 10/2003 | Cai | G06F 1/3203 713/300 |
| 7,577,771 B2 | 8/2009 | Steeb et al. | |
| 7,769,805 B1 | 8/2010 | Barnes et al. | |
| 2003/0182627 A1* | 9/2003 | Chung | G11B 20/10 715/201 |
| 2004/0078508 A1* | 4/2004 | Rivard | G06F 11/2089 711/4 |
| 2005/0021784 A1 | 1/2005 | Prehofer | |
| 2005/0210514 A1 | 9/2005 | Kittlaus et al. | |
| 2006/0061563 A1 | 3/2006 | Fleck | |

(Continued)

OTHER PUBLICATIONS

CNN Tech "Bold new e-readers grab attention at CES," retrieved on Mar. 9, 2010 at <<http://www.cnn.com/2010/TECH/01/08/ces.ereader/index.html>>, pp. 1-7.

(Continued)

*Primary Examiner* — Sean D Rossiter
(74) *Attorney, Agent, or Firm* — Steve Wight; Sandy Swain; Micky Minhas (57) ABSTRACT

A dual-mode, dual-display shared resource computing (SRC) device is usable to stream SRC content from a host SRC device while in an on-line mode and maintain functionality with the content during an off-line mode. Such remote SRC devices can be used to maintain multiple user-specific caches and to back-up cached content for multi-device systems.

20 Claims, 9 Drawing Sheets

(56) References Cited

U.S. PATENT DOCUMENTS

| | | | | |
|---|---|---|---|---|
| 2007/0113015 | A1* | 5/2007 | Moll | G06F 1/3203 |
| | | | | 711/135 |
| 2009/0153473 | A1 | 6/2009 | Davis et al. | |
| 2009/0217058 | A1* | 8/2009 | Obereiner | G06F 12/1458 |
| | | | | 713/193 |
| 2009/0249014 | A1* | 10/2009 | Obereiner | G06F 12/1441 |
| | | | | 711/164 |
| 2009/0254713 | A1 | 10/2009 | Jeong | |
| 2010/0156913 | A1* | 6/2010 | Ortega | G06F 3/1438 |
| | | | | 345/520 |
| 2010/0185821 | A1* | 7/2010 | Paver | G06F 12/0831 |
| | | | | 711/146 |
| 2010/0202238 | A1* | 8/2010 | Moshayedi | G06F 11/1658 |
| | | | | 365/228 |
| 2010/0225640 | A1 | 9/2010 | Vieri et al. | |
| 2011/0080417 | A1 | 4/2011 | Lin et al. | |
| 2012/0297182 | A1* | 11/2012 | Hawkins | H04L 9/088 |
| | | | | 713/150 |
| 2016/0034023 | A1* | 2/2016 | Arora | G06F 1/3296 |
| | | | | 711/137 |
| 2016/0085451 | A1* | 3/2016 | Lee-Baron | G06F 3/0619 |
| | | | | 711/113 |
| 2016/0210234 | A1* | 7/2016 | Park | G06F 1/32 |

OTHER PUBLICATIONS

Huizinga, Heflinger, "Experience with Connected and Disconnected Operation of Portable Notebook Computers in Distributed Systems," retrieved on Dec. 10, 2009 at <<http://ieeexplore.ieee.org/stamp/stamp.jsp?arnumber=04624435>>, IEEE Computer Society, First Workshop on Mobile Computing Systems and Applications (WMCSA), 1995, pp. 119-123.

"KNFB Reader Frequently Asked Questions," retrieved on Dec. 14, 2009 at <<http://www.knfbreader.com/faq.php>>, knfb Reading Technology Inc., 2008, pp. 1-4.

Marl, "User Data and Settings Management," retrieved at <<http:///technet.microsoft.com/en-us/library>>, Jul. 23, 2003, 30 pages.

Microsoft, System requirements for Windows XP operating systems, retrieved at <<http://support.microsoft.com/kb/314865>>, Sep. 2007, 3 pages.

Microsoft, Wireless Deployment Technology and Component Overview, retrieved at <<http://technet.microsoft.com/en-us/library>>, Feb. 2007, 41 pages.

NetSupport School, retrieved at <<http://www.netsupportschool.com>>, available at least as early as Dec. 16, 2009, 8 pages.

Office action for U.S. Appl. No. 12/720,514, mailed on Oct. 29, 2012, Izadi et al., "Dual-Mode, Dual-Display Shared Resource Computing," 13 pages.

Office action for U.S. Appl. No. 12/720,514, mailed on Mar. 11, 2013, Inventor #1, "Dual-Mode, Dual-Display Shared Resource Computing," 15 pages.

Office action for U.S. Appl. No. 12/720,514, mailed on Mar. 20, 2014, Izadi et al., "Dual-Mode, Dual-Display Shared Resource Computing," 7 pages.

"Offline Resources in Firefox," retrieved on Dec. 10, 2009 at <<https://developer.mozilla.org/en/Offline_resources_in_Firefox>>, Sep. 19, 2009, pp. 1-9.

Topolsky, "Olympus creates 360-degree HD camera and projector," retrieved on Dec. 10, 2009 at <<http://www.engadget.com/2007/11/21/olympus-creates-360-degree-hd-camera-and-projector/>>, Nov. 21, 2007, pp. 1-7.

"What's New in Offline Files for Windows Vista," retrieved on Dec. 10, 2009 at <<http://technet.microsoft.com/en-us/library/cc749449(WS.10).aspx>>, Microsoft Corporation, Microsoft TechNet, 2009, pp. 1-17.

* cited by examiner

INFORMATION TRANSMISSION BASED ON MODAL CHANGE

RELATED APPLICATION

This application is a continuation of and claims priority to U.S. patent application Ser. No. 12/720,514, filed on Mar. 9, 2010, the disclosure of which is incorporated by reference herein.

BACKGROUND

Today, for many portable shared-resource computing (SRC) device users, battery life and connectivity can be a source of concern. One solution is to have content streamed to the mobile device from a host SRC device. This removes the need for local applications, and hence these thin client remote SRC devices may operate with minimal processor requirements. To maintain operability, the client device will need to keep network connectivity with the host device. However, by requiring constant network connectivity, an SRC device may experience lags or crashes when briefly disconnected, and is also constrained to scenarios where the thin client has network connectivity—which is a problem in scenarios such as in planes, trains, automobiles, etc.

An SRC environment may operate by hosting content, and applications to access the content, on a host SRC device. This content may then be streamed to multiple remote devices, such as laptop form factor devices, tablet form factor devices, and other portable handheld devices. However, remote devices with network interface connectivity and high refresh-rate displays may be too power intensive to offer reasonable battery life.

Unfortunately, adequate devices do not exist for operating SRC environments when users travel in and out of connectivity. Portable SRC devices, while available, are used in a small subset of instances due to network connectivity issues and battery life. When used, existing SRC devices merely display streamed images while connected, and lack the ability to function effectively while disconnected and/or save battery life effectively. Accordingly, there is a need for a device that further aids users in SRC environments.

BRIEF SUMMARY

This summary is provided to introduce simplified concepts of dual-mode, dual-display SRC devices, systems, and methods, which is further described below in the Detailed Description. This summary is not intended to identify essential features of the claimed subject matter, nor is it intended for use in determining the scope of the claimed subject matter. Generally, the dual-mode, dual-display SRC devices and methods described herein involve a dual-display device with at least one low power display, such as an electronic ink display. The low power display allows for an off-line mode for viewing previously streamed content while not connected to a network, or for saving battery power. Additionally, a second display may offer an on-line mode for streaming and interacting with content stored on a host SRC device.

In one aspect, a device may be designed to combine two monitors and/or may be configured to operate in two different modes. The modes may be activated based on a user action which may include closing a lid, changing a physical orientation, or activating a switch for example. Based on the action of the user, the device may change from one mode to another, and may be configured to utilize a different display for each mode. One of the displays may be an electronic ink display and one of the displays may be a display other than an electronic ink display. The device may display content streamed from a host device on one display during one mode, store content to a memory cache cache, and display the cached content during a different mode.

In another aspect, a device may be designed to maintain multiple cache locations in memory, store user-specific bitmap images of previously and/or currently streamed content for one user in a user-specific cache location, store user-specific bitmap images for another user in another user-specific cache location, and grant access of the content to each respective user based on which user is currently logged-in.

In yet another aspect, a cache updating system may be implemented within an SRC environment by receiving a user's cache content at a host device that was transmitted from the user's remote device. The system may store the cache content in the memory of the host device and determine if other remote SRC devices belong to the user. If so, the system may transmit the cache content to the other remote devices belonging to the user to back-up the user's sessions on the user's other devices. The cache content may be made up of bitmap images that were previously streamed from the host device to the user's remote device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes a remote SRC device and methods for implementing multi-user remote SRC devices and multi-device SRC environments. In particular, systems and methods are presented for implementing a dual-mode, dual-display SRC device, storing user-specific memory cache at a host SRC device, and backing-up user and/or session cache content for updating multiple remote SRC devices of a single user.

As discussed above, remote SRC devices, including thin client devices, are often used for streaming content from a host SRC device. The host SRC device may store, operate, and manipulate the content directly, while the remote SRC device may merely view and interact with the interaction by streaming user input such as from a touch screen or stylus back to the host SRC device. In this way, the user's experience of viewing the content is facilitated by streaming bitmap images of content from the host SRC device. However, when battery power runs low, or network connectivity is a problem, these devices become relatively inoperable. Without a continuous stream of bitmap images, the remote device may be unable to display the content.

The techniques described in this disclosure may be used for effectively avoiding the inability to display content without a network connection by utilizing two display screens, at least one of which is a cholesteric, or other low-power, low refresh-rate display, and at least two modes of operation. For convenience only, when referring to such a cholesteric-type, or other low-power, low refresh-rate display, this disclosure will make reference to an electronic ink display, or e-ink display. However, it should be understood, that any type of low-power, low refresh-rate display may be used, and the display should not be limited to cholesteric-type or electronic ink displays. The two modes of operation, one of which will operate with a larger instruction set and require more power than the other, may be configured to control the two different displays independently. The high-power mode may be used to operate a high refresh-rate display and stream content, including related and linked content, to the remote device while a network connection is available. The low-power mode may be used to operate an electronic ink display, which requires much less power than a high refresh-rate display, and display only images stored in a local cache. Thus a user need not always maintain connectivity to view the content of the host SRC device.

The dual-mode, dual-display device may entail operating one mode, with one display, for streaming and displaying images (of any format) from a host device in a fully interactive format, and operating another mode, with an electronic ink display, for viewing previously streamed content that was stored in a local cache. In one aspect, the first mode may utilize a wired, or wireless, network interface to communicate with a host SRC device, other inputs and outputs, as well as a high refresh-rate display, such as, but not limited to, a liquid crystal display (LCD), a light emitting diode (LED) display, or an organic light emitting diode (OLED) display. In another aspect, or in conjunction with the previous example, the second mode may utilize an electronic ink display and an input device such as one or more buttons or switches. A method of maintaining multiple cache locations for multiple users of the same remote device is also disclosed that allows for different users to use the same device to stream, store, and view different content from the same, or potentially different, host SRC device(s). Additionally, the ability to back-up a user's cache, representing a previous remote session, to the host device is disclosed that allows a user to use multiple remote devices and automatically maintain the same content, and/or session, from one remote device to the next.

For enabling off-line use of host SRC content, the remote device may utilize a memory cache location, or multiple memory cache locations, to store previously streamed content. In one aspect, the content streamed may include related content or linked content. By way of example, and not limitation, if a user is viewing a particular page of a word processing document, the host SRC device may stream the page being viewed plus all, or a subset of all, of the pages of the document. The viewed page, plus the other related pages, may all be stored in the local cache during the first mode. Additionally, the content may also be stored in a buffer during lost connectivity in the first mode and later transferred to the local cache. This way, if the user were to lose connectivity while viewing the document, they would be able to switch to the second mode to continue viewing the page. Additionally, the user would still have access to the other pages in the document.

By way of example, and not limitation, when operating the disclosed device, a user may select to view their electronic mail (email) client, hosted at the host SRC device, to read their incoming messages (Inbox). In the first mode, the remote device may request the first email stored in the email client to be streamed to the remote device. Instead of simply receiving a stream including only the first email, however, the disclosed device may receive streamed bitmaps of every email message in the Inbox, and all attachments associated with each email. These bitmaps may then be stored in the memory cache of the remote device for viewing during the second mode. If the remote device became low on battery life, or if the user suddenly lost their network connection (e.g., their train entered a tunnel, they entered an airplane, etc.), they may simply switch the device to the second mode and be able to view the email they were previously viewing. For shorter interruptions in connectivity, the user may be able to continue in the second mode, viewing the cached content. Additionally, all the other emails and attachments saved in the cache may be available as well. In this way, a user may decide to save battery power at any time by switching to the second mode. Additionally, the user may seamlessly switch from a connected state to an un-connected state without losing device functionality.

In some aspects, the second mode may capture content annotations of the user and transmit those annotations to the host SRC device during the first mode, once the connection is re-established. In other aspects, the user may be able to switch modes by closing the lid of the device, changing the physical orientation of the device (e.g., turning the device over), or by simply activating a switch of the device. Additionally, the device may be able to switch modes automatically upon loss of network connectivity.

In some aspects, the device may be able to store multiple sessions for a plurality of users. For example, two different users may be able to use the same device, and upon logging-in, the user will be presented with the content (e.g., the image) they viewed the last time they accessed the device. In other aspects, a user may have multiple devices and have the ability to have the cache of their last session backed-up at the host SRC device. This backed-up cache may then be transmitted to each device controlled by that specific user. In this way, regardless of which remote device the user activates next, they will be presented with the content they viewed the last time they accessed any of their remote devices.

Figure 1:
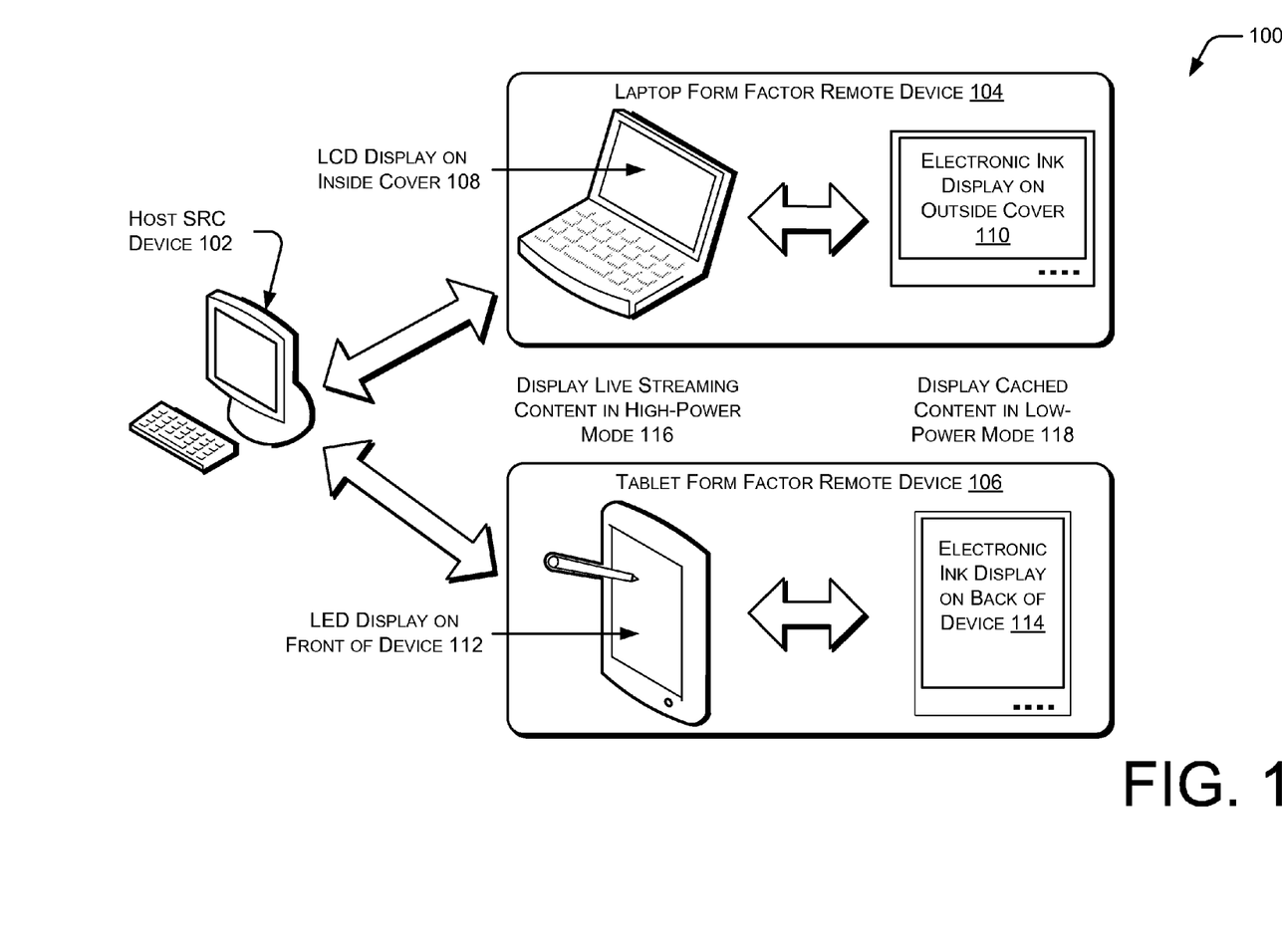
FIG. 1 is a schematic diagram of an illustrative dual-mode, dual-display SRC environment.

FIG. 1 depicts an illustrative schematic diagram illustrating a high-level overview of a dual-mode, dual-display SRC environment 100. The environment 100 includes a host SRC device 102, a laptop form factor remote SRC device 104, and a tablet form factor remote SRC device 106. Environment 100, however, could include any type of remote device including, but not limited to, cellular phones, personal digital assistants (PDAs), electronic book readers, and/or handheld navigation devices.

Each of the two remote SRC devices 104 and 106 may contain two displays for viewing and/or interacting with content. By way of example, and not limitation, laptop form factor remote SRC device 104 contains an LCD display 108 and an electronic ink display 110. In one aspect, electronic ink display 110 may be found on the back of the cover of laptop form factor remote SRC device 104; however, in other aspects the electronic ink display 110 may be found in other locations. Additionally, by way of example only, tablet form factor remote SRC device 106 may contain an LED display 112 on the front of the device and an electronic ink display 114 on the back of the device.

The environment 100 may allow for the streaming of live content in a high-power (relative to the second mode) mode 116, associated with both the LCD display 108 and the LED display 112. By way of example only, during the high-power mode 116, remote SRC devices 104 and 106 may be able to stream content (via a network interface), display content on high refresh rate displays (e.g., LCD, LED, OLED, etc.), and allow user interaction with the live content. The live content and associated additional content, as discussed above and in further detail below, may be stored in a local cache for later display. Additionally, environment 100 may also allow for the viewing of the stored cache content during a low-power mode 118. During this mode, user interaction may be limited to annotating documents, moving forward or backward within documents, opening and closing documents that are stored in the cache, and/or deleting documents. By way of example, and not limitation, annotations made during low-power mode 118 may be stored in the cache and then transmitted back to the host SRC device 102 for updating the stored document once connectivity is restored.

Figure 2:
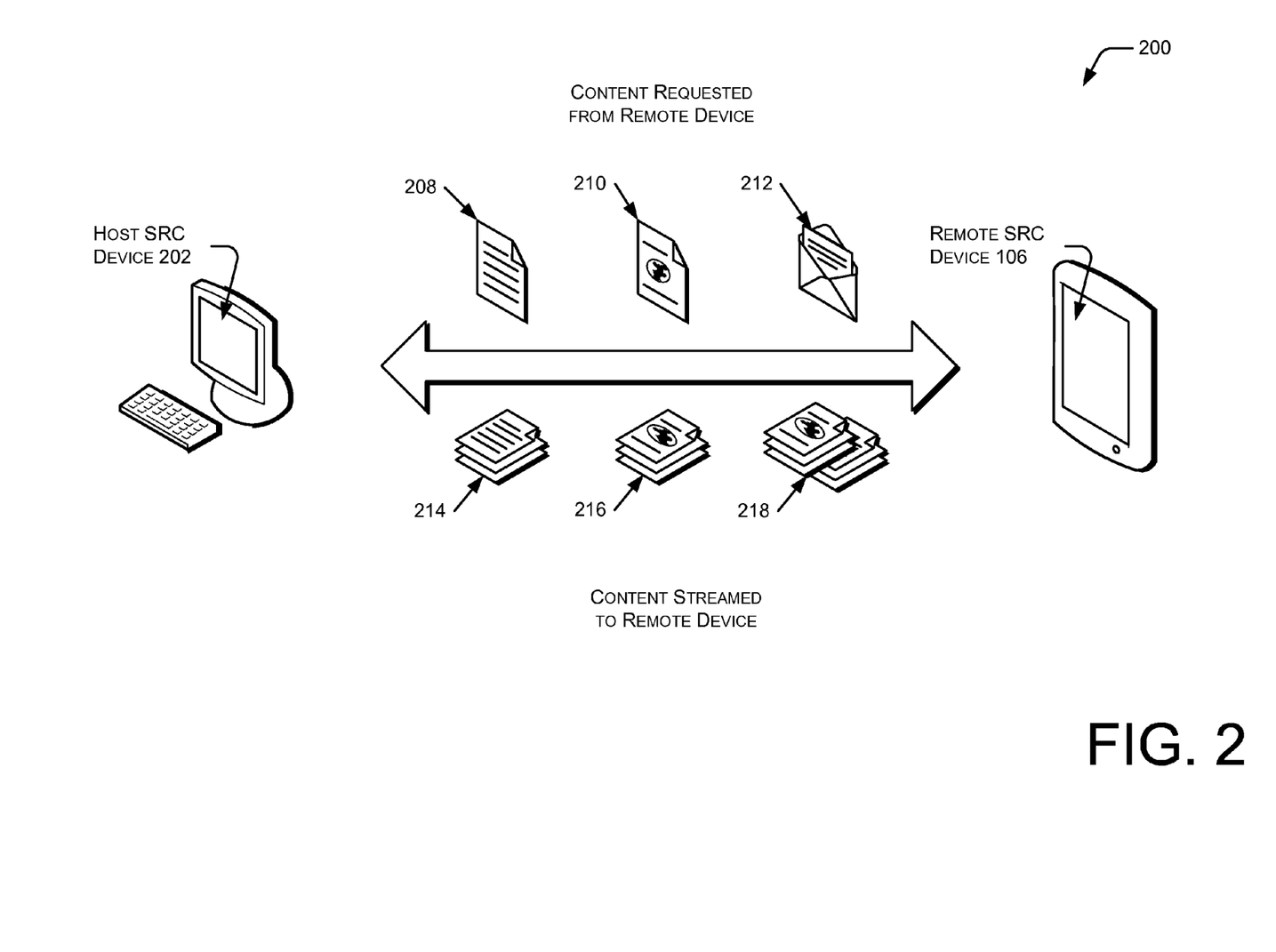
FIG. 2 is a schematic diagram of an illustrative SRC streaming method for a dual-mode, dual-display SRC device.

FIG. 2 depicts an illustrative schematic diagram illustrating an SRC streaming method 200 that may be used for streaming bitmap images and/or audio files from a host SRC device 202 to a remote dual-mode, dual-display SRC device such as device 106, or a similar device, such as device 104 (not shown here). By way of example, and not limitation, remote SRC device 106 may request content in the form of a word processing document 208, a Web page document 210, and/or an email document 212. Additionally, documents 208-212 may be related to, or associated with, other documents or they may have additional documents embedded within them. In one aspect, a user may request to view page one of a 25 page document (e.g., document 208). In this example, the other 24 pages may be related to page one; therefore, method 200 may stream all 25 pages (represented as content streamed to remote device 214), rather than just streaming page one. This way, the entire document can be cached, and later viewed during the low-power mode when streaming is no longer available nor desired.

In another aspect, content requested from device 106 may be a Web document, a Web page, or a word processing document containing hypertext markup language (HTML) hyperlinks that provide access to websites. In this example, when remote SRC device 106 requests that document 210 be streamed, method 200 may stream related documents 216. By way of example, and not limitation, content streamed to remote device 106 may be all, or some, of the content related to, or embedded within document 210, such as all documents referenced in document 210, all Web pages referenced by hyperlinks, all images embedded in document 210, and/or additional content that may be of value to the user.

In yet another aspect, content requested from device 106 may be an email document. In this example, when remote SRC device 106 requests the email document 212, method 200 may stream all, or a predetermined set of, related documents 218, such as, but not limited, email attachments, previous responses and forwards (i.e., email history), and/or contact related information. Additionally, users may set the threshold or amount of related additional content that is to be streamed to the remote device or it may be set automatically.

FIGS. 1 and 2 provide simplified examples of suitable devices for a dual-mode, dual-display SRC environment, and suitable methods for an SRC streaming method according to the present disclosure. However, other configurations are also possible. For example, while the full-power displays of remote SRC devices 104 and 106 are shown as LCD and LED displays, any type of digital display is suitable. Moreover, remote SRC devices 104 and 106 may be any type of portable, or non-portable, remote electronic device, with or without an operating system. For example, any thin client device would be suitable. Additionally, while an electronic ink display is shown as the second display, any type of low-power, low refresh-rate display may be used. Further, while content requested from remote device 208-212 are shown as word processing documents, Web documents, or email documents, any type of electronic document would be suitable, including but not limited to, spreadsheet documents, drawings, digital photographs, audio files, video files, etc. For example, electronic documents may include both text documents, like those listed above, and non-text documents, such as audio documents, video documents, software documents, etc.

Additionally, while the devices of FIGS. 1 and 2 are shown as dual-mode, dual-display SRC devices, SRC devices which are only dual-mode and SRC devices which are only dual-display may be implemented as well. In particular, dual-mode SRC devices with only one display may have advantages over other devices in that they may provide interactivity with host SRC content when network connectivity is unexpectedly or momentarily lost. Alternatively, dual-display SRC devices with only one mode may be advantageous in that they provide enhanced battery savings due to their ability to manage the device's power consumption.

Illustrative Computing Environment

Figure 3:
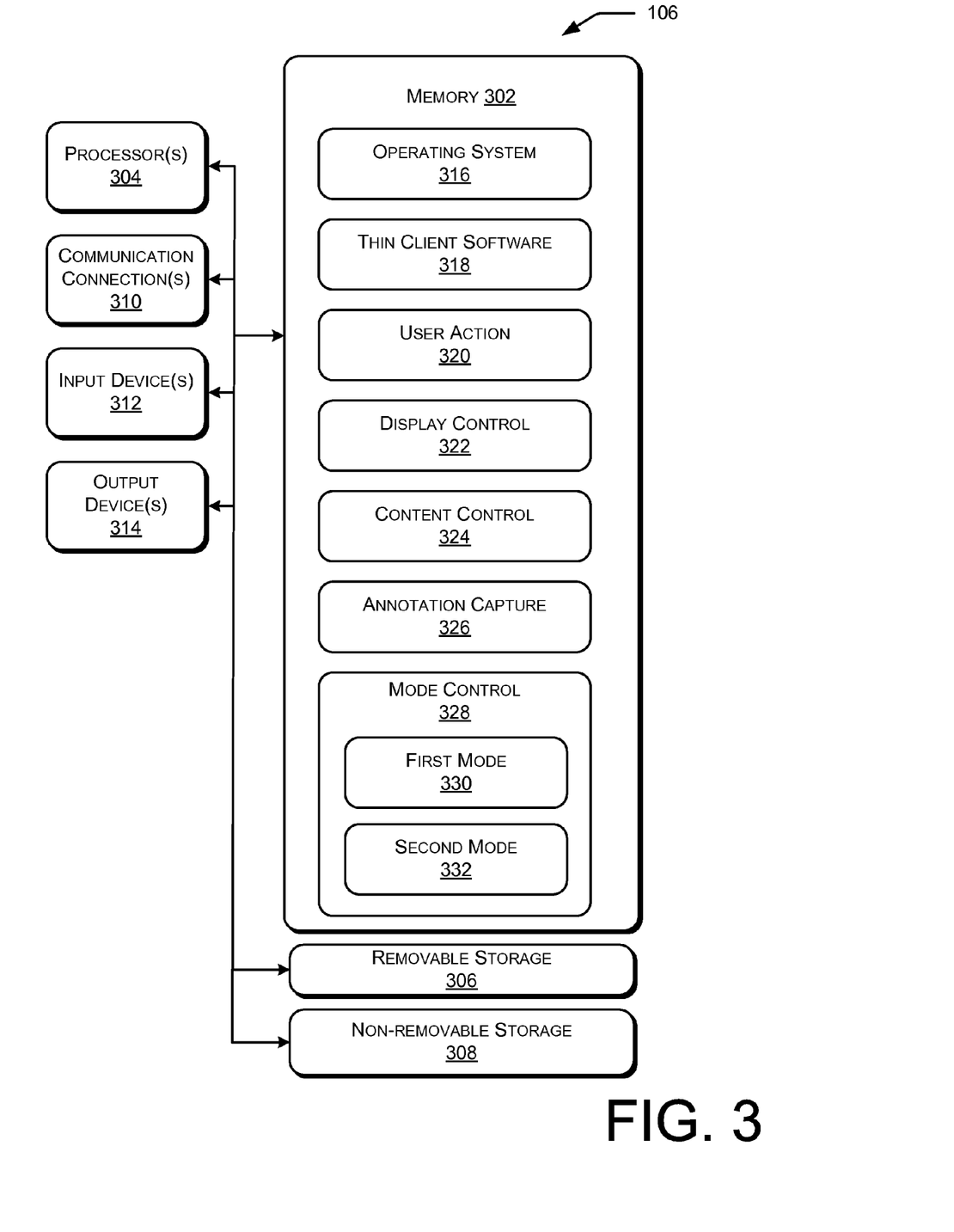
FIG. 3 is a block diagram of an illustrative system for implementing a dual-mode, dual-display SRC device.

FIG. 3 provides an illustrative overview of one computing device 106, in which aspects of the invention may be implemented. The computing device 106 may be configured as any suitable computing device capable of implementing a dual-mode, dual-display remote SRC device, environment, and accompanying methods, such as, but not limited to devices described in reference to FIG. 1. By way of example and not limitation, suitable computing devices may include personal computers (PCs), servers, server farms, datacenters, or any other device capable of storing and executing all or part of the SRC environment.

In one illustrative configuration, the computing device 106 comprises at least a memory 302 and one or more processing units (or processor(s)) 304. The processor(s) 304 may be implemented as appropriate in hardware, software, firmware, or combinations thereof. Software or firmware implementations of the processor(s) 304 may include computer-executable or machine-executable instructions written in any suitable programming language to perform the various functions described.

Memory 302 may store program instructions that are loadable and executable on the processor(s) 304, as well as data generated during the execution of these programs.

Depending on the configuration and type of computing device, memory 302 may be volatile (such as random access memory (RAM)) and/or non-volatile (such as read-only memory (ROM), flash memory, etc.). The computing device or server may also include additional removable storage 306 and/or non-removable storage 308 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 302 may include multiple different types of memory, such as static random access memory (SRAM), dynamic random access memory (DRAM), or ROM.

Memory 302, removable storage 306, and non-removable storage 308 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 302, removable storage 306, and non-removable storage 308 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing device 106 may also contain communications connection(s) 310 that allow the computing device 106 to communicate with a stored database, another computing device or server, user terminals, and/or other devices on a network, such as remote SRC device 104 of FIG. 1.

The computing device 106 may also include input device(s) 312 such as a keyboard, mouse, pen, voice input device, touch input device, etc., and output device(s) 314, such as a display, speakers, printer, etc.

Turning to the contents of the memory 302 in more detail, the memory 302 may include an operating system 316 and one or more application programs or services for implementing the dual-mode, dual-display SRC environment 100. However, remote SRC devices 104 and 106 may, but need not, be implemented as a thin client without an operating system. For example, memory 302 may also (or in the alternative) include a thin client software module for implementing a remote device without an operating system. The thin client device may be configured to, among other things, stream and display content in a first mode, cache the content, and display the content in a second low-power mode.

The memory 302 may further include a user action module 320 and a display control module 322. The user action module 320 may be configured to receive a user action at an actuator resident on the device 104 or 106 for switching between modes. In one aspect, the user action module may receive an instruction to switch modes based on the user closing a lid of the device, changing a physical orientation of the device, and/or activating a switch of the device. The display control module 322 may be configured to display content on a first display during the first mode and display content on the second display during the second mode. By way of example, and not limitation, the first mode may be a full-power mode where a high refresh-rate display is used and the second mode may be a low-power mode where an electronic ink or other low-power, low refresh-rate display is used.

Memory 302 may further include a content control module 324 and an annotation capture module 326. The content control module 324 may be configured to display live streamed content on a high refresh-rate display during a high-power mode and store the streamed content in a local memory cache during the high-power mode. Additionally, the content control module may be configured to display the stored cached content on an electronic ink display during a low-power mode. The annotation capture module 326 may be configured to capture content annotations of a user during the low-power mode and store the content annotations in the local memory cache. The annotation capture module 326 may also be configured to transmit the content annotations stored in the cache back to the host SRC device 102 once the full-power mode is reactivated.

Memory 302 may also include a mode control module 328, which may control a first mode module 330 and a second mode module 332. The mode control module 328 may be configured to receive instructions from the user action module 320 and determine, based at least in part on the user action, which mode to activate. First mode module 330 may be configured to activate a full-power mode. By way of example, and not limitation, the full-power mode may operate a high refresh-rate display, such as an LCD, LED, OLED, etc., a network interface component, an input device, such as a keyboard, mouse, touchscreen, etc., at least another output device, such as a speaker, and/or a peripheral device. During full-power mode, the remote device may be able to stream content, display the content, allow interaction with the content, and store the content in a local cache. The second mode module 332 may be configured to activate a low-power mode. By way of example, and not limitation, the low-power mode may operate an electronic ink display (or other low refresh-rate, low power consumption display), and an input device such as a touchscreen, touchpad, button, etc. During low-power mode, the remote device may be able to display the content stored in the cache that was previously streamed during the full-power mode. Additionally, by way of example, and not limitation, during the low-power mode, a user may be able to access additional content stored in the cache that is related to the originally requested content.

FIG. 3 provides simplified examples of a suitable computer device. However, other configurations are also possible. For example, while one processor is shown, any number of processors is suitable. Additionally, mode control module 328 is shown with first mode module 330 and second mode module 332; however, more than two modes and/or more than two mode modules may also be suitable.

Illustrative Dual-Mode, Dual-Display Remote SRC Device & Activation

Figure 4:
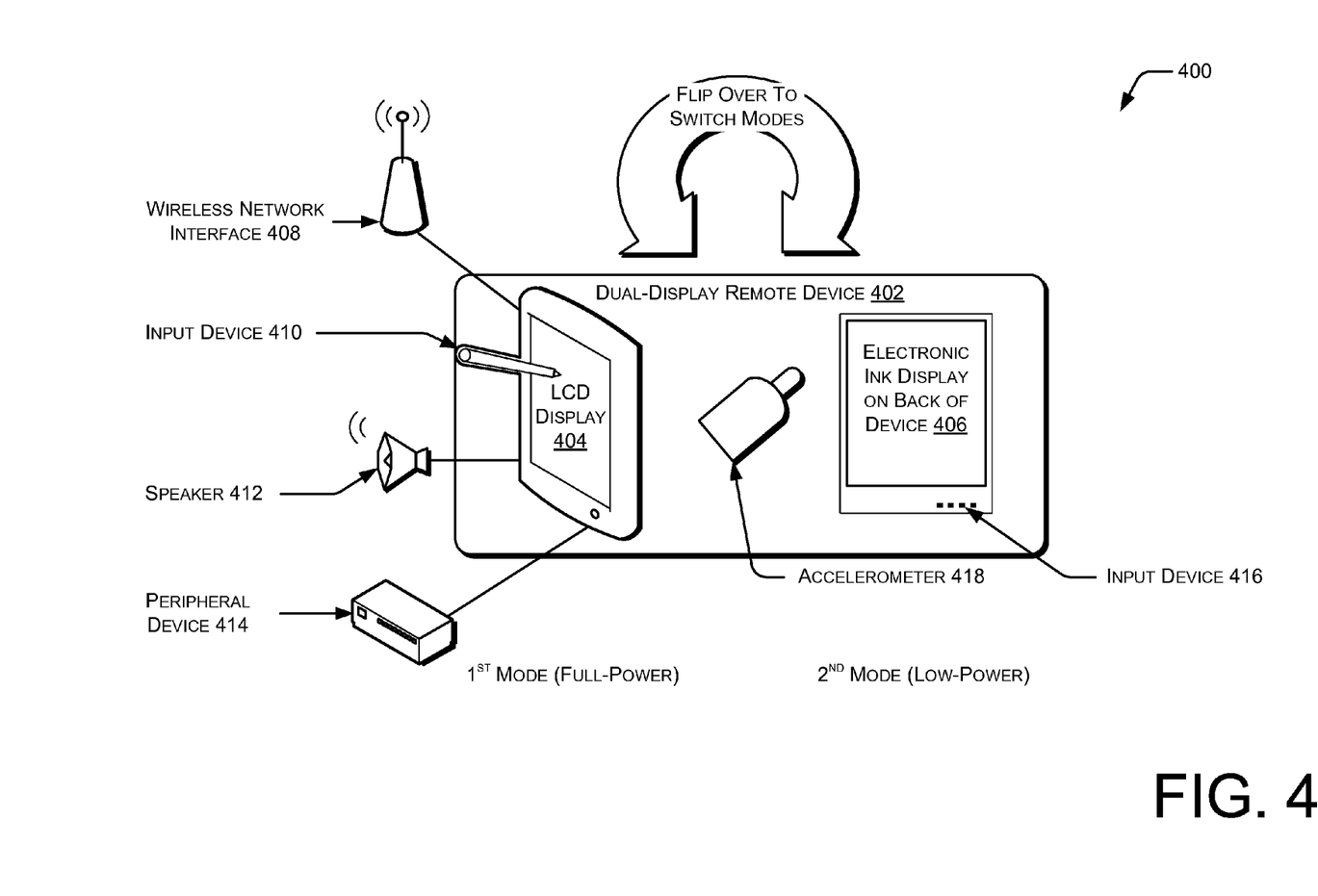
FIG. 4 is a schematic diagram of illustrative methods for activating and controlling a dual-mode, dual-display remote SRC device.

FIG. 4 depicts an illustrative schematic diagram illustrating methods 400 for activating and controlling a dual-mode, dual-display remote SRC device (the device) 402. By way of example, and not limitation, The Device 402 may be designed as a tablet form factor device with an LCD display 404 on the front and an electronic ink display 406 on the back. Additionally, for example only, the device 402 may operate in at least two modes, a first mode (or full-power mode) and a second mode (or low-power mode). In the first mode, the device 402 may be configured to function with a wireless network interface 408, an input device 410, a speaker 412, and/or a peripheral device 414. Wireless network interface 408 may be any type of network interface (wired or wireless), and input device 410 may be a pen-type input device, a button or switch on the device, a touchscreen, a keyboard, or other type of input device. Additionally, speaker 412 may include multiple speakers or other type of audio output devices, and peripheral device 414 may be any type of peripheral device, such as a printer, cellular interface, memory card reader, bus interface, etc.

Also by way of example, and not limitation, in the second mode, the device 402 may be configured to function with an electronic ink display 406 and an input device 416, such as a button, switch, or touchscreen display. In this mode, the network interface card (NIC), high refresh-rate display, etc. may be disabled. Input device 416 may be used in the second mode for moving forward or backward within a document, switching to a different document stored in the cache, or making annotations in the document (as described above). Additionally, as should be understood, both modes of the device 402 may be configured to operate shared memory locations, including one or more caches.

As discussed above, a user of the device 402 may decide to switch modes because a network connection was lost, in order to save battery power, or for any other reason. By way of example, and not limitation, mode switching may be effectuated by a user action, such as flipping over the device (shown by the large curved arrow), closing the lid of the device (e.g., with a laptop form factor device or flip phone cellular form factor device), or activating a switch or button on the device. The device 402 may contain an accelerometer 418 for signaling to the device 402 that the device's physical orientation has changed. Additionally, other types of user actions may be appropriate based on the physical design and/or form factor of the remote SRC device.

Figure 5:
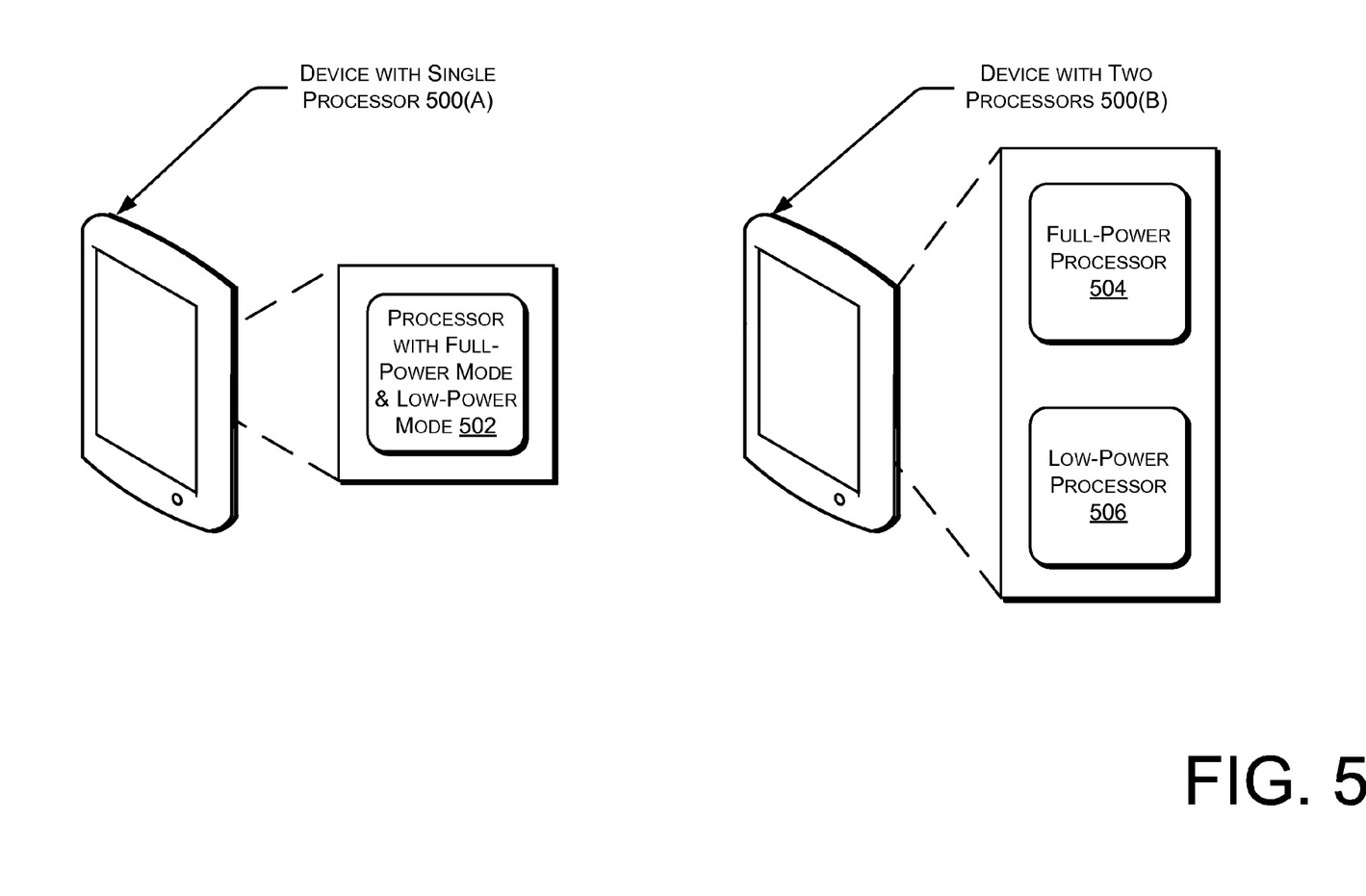
FIG. 5 is a schematic diagram of illustrative dual-mode devices with dual-mode processors and/or multiple processors.

FIG. 5 depicts an illustrative schematic diagram illustrating a dual-mode, dual-display remote SRC device with a single processor 500(A) and a dual-mode, dual-display remote SRC device with at least two processors 500(B). By way of example, and not limitation, device 500(A) may contain only one processor 502. Processor 502 may be configured to operate in either a full-power mode or a low-power mode. Additionally, device 500(A) may contain other processors. Also by way of example, and not limitation, device 500(B) may contain at least two processors 504 and 506. Processor 504 may be a full-power processor and processor 506 may be a low-power processor. By way of example only, full power processors like the Intel Core i7-975 Extreme Edition may consume up to 130 W at peak while low power processors like the Intel Atom Z500 may only consume up to 0.65 W at peak, both of which are available from Intel Corporation of Santa Clara, Calif. Full-power processor 504 may require more power than low-power processor 506 and may operate on a larger instruction set. In one aspect, the full-power processor 504 may be used to operate the first mode and/or a high refresh-rate display (e.g., an LCD, LED, OLED, etc.), and the low-power processor 506 may be used to operate the second mode and/or an electronic ink display. Additionally, other configurations of processors may be used, such as multiple processors working together, each with a full-power and low-power mode, or multiple processors working together, some being full-power processors and some being low-power processors.

FIGS. 4 and 5 provide simplified examples of a suitable remote SRC device. However, other configurations are also possible. For example, more or less input devices, output devices, peripheral devices, and displays may be used. Additionally, more or less processors and modes may be suitable as well. Moreover, as noted above regarding FIGS. 1 and 2, while the devices of FIGS. 4 and 5 are shown as dual-mode, dual-display SRC devices, SRC devices which are only dual-mode and SRC devices which are only dual-display may be implemented as well.

Figure 6:
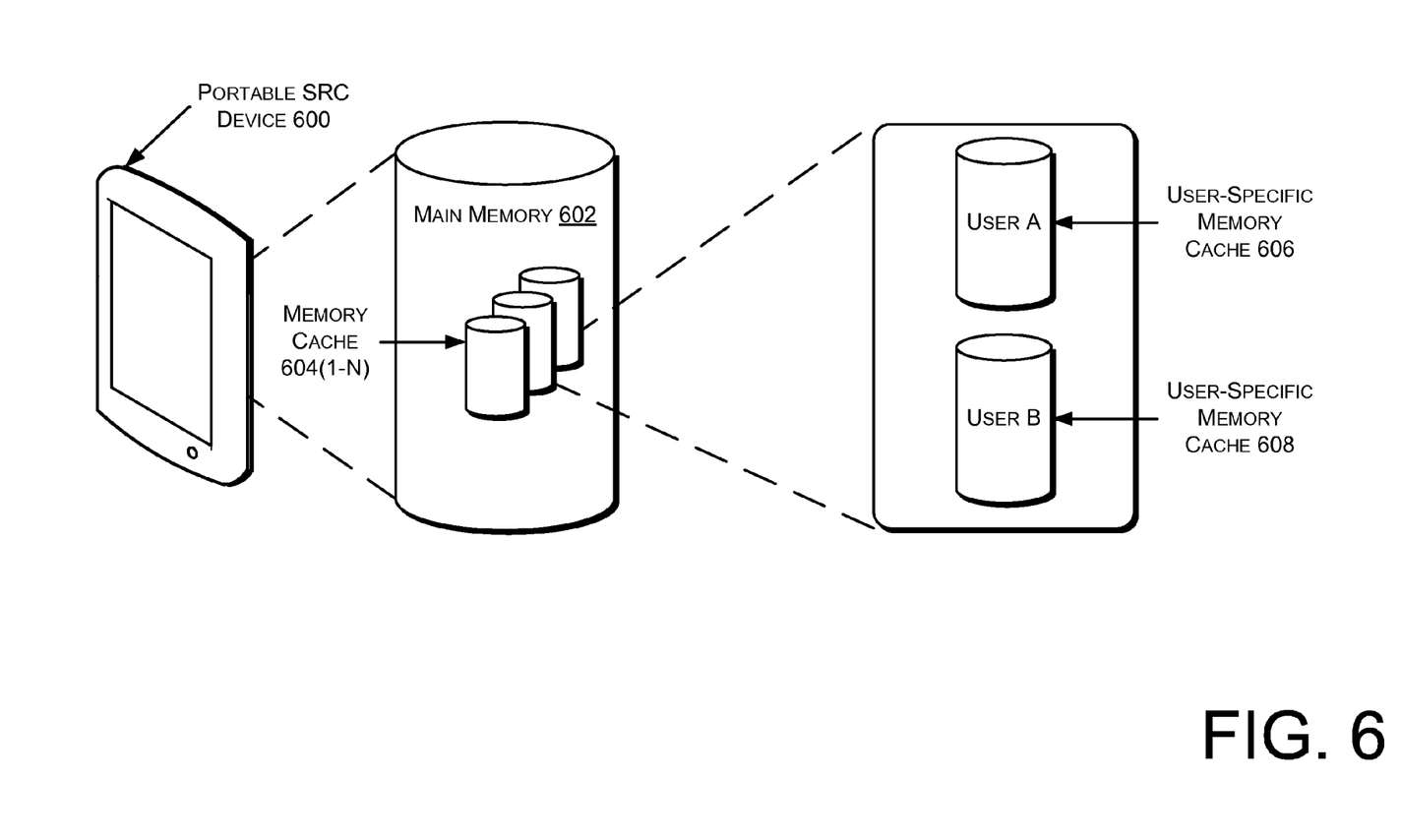
FIG. 6 is a schematic diagram of an illustrative device with multiple user-specific memory cache locations.

Illustrative Dual-Mode, Dual-Display Remote SRC Device with User-Specific Caches FIG. 6 depicts an illustrative schematic diagram illustrating a portable SRC device 600 containing at least main memory 602 which contains at least multiple memory cache locations 604(1-N). By way of example, and not limitation, multiple memory cache locations 604(1-N) may be made up of user-specific memory cache locations, such as user-specific memory cache 606 and user-specific memory cache 608. User-specific cache memories 606 and 608 may be used to store previously streamed bitmap images for multiple different users (e.g., User A and User B).

In one aspect, portable SRC device 600 is configured for use by two users (User A and User B). User A and User B may use device 600 at different times and may use device 600 to access different content stored at a host SRC device (also not shown). For example, User A may use device 600 to check emails while User B may use device 600 to read a website. The content accessed by both users may be stored at the host SRC device, and bitmap images of the content may have been streamed to the device 600 at different times. In one example, while User A is accessing email content, device 600 may store the streaming, or streamed, content and other related content in user-specific memory cache 606. In another aspect, while User B is accessing a website, device 600 may store the streaming, or streamed, content and other related content in user-specific memory cache 608.

By storing different content associated with different users in separate user-specific memory cache locations, device 600 may allow for User A and User B to each operate the device independently and seamlessly. For example only, if User A operates device 600 sometime after User B's last use, User A may still be presented with the content that User A last accessed without the need to activate the full-power mode (described above) to re-stream the content. Thus, each user's last session, or multiple last sessions, may be stored on the device via the use of user-specific memory cache.

Figure 7:
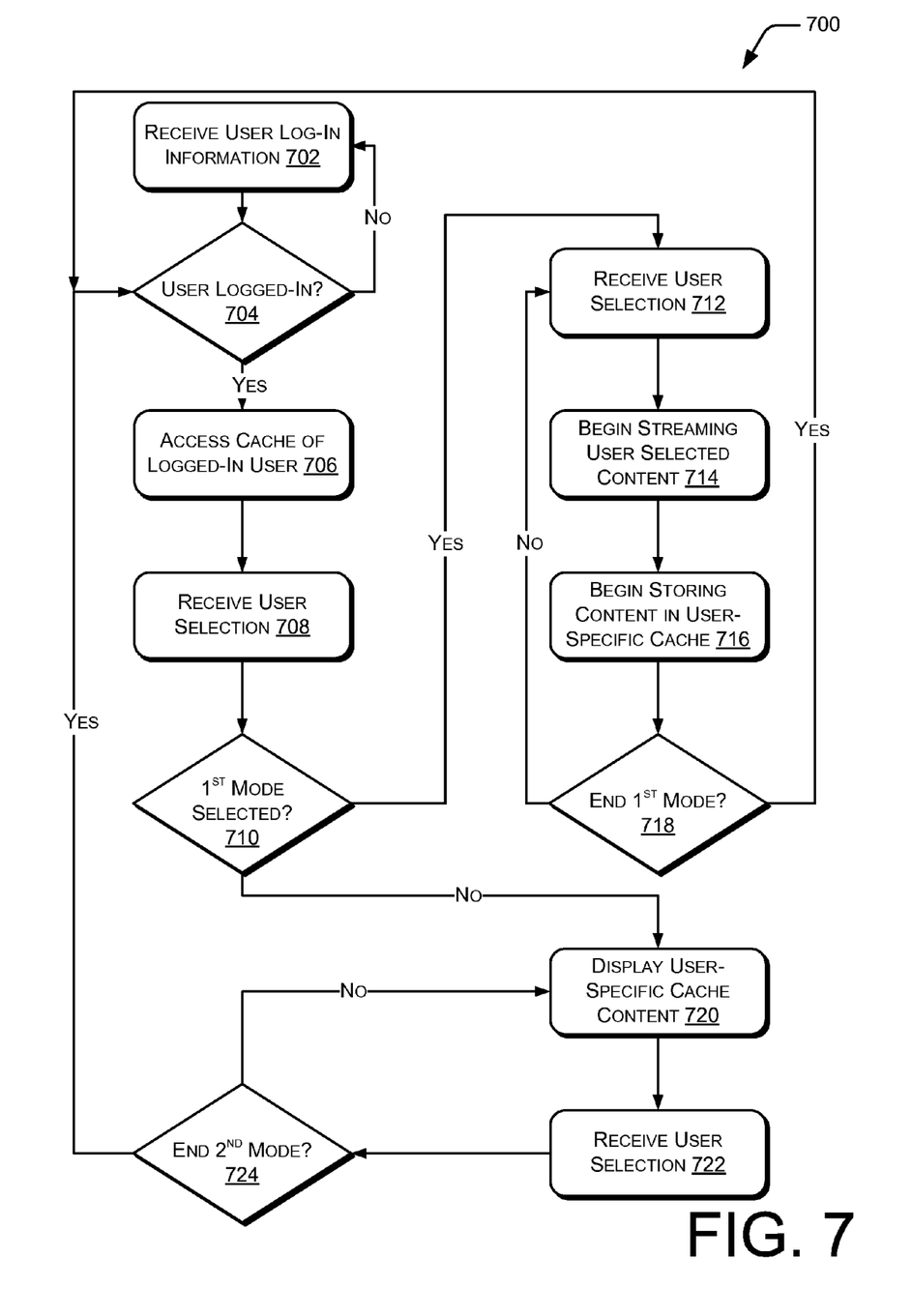
FIG. 7 is a flowchart illustrating details of an illustrative method of accessing user-specific cache content in a multi-user remote SRC device.

FIG. 7 is a flow diagram of one illustrative method 700 for accessing user-specific cache content in a multi-user remote SRC device. As discussed above, user-specific cache content may allow multiple users to use the same device. The method 700 may, but need not necessarily, be implemented using the dual-mode, dual-display SRC environment 100 shown in FIG. 1. In this particular implementation, the method 700 begins at block 702 in which the method 700 receives a user's log-in information. Often, but not always, a user may have to log into a remote SRC device in order to authenticate identity. Additionally, logging-in may notify the device which user-specific cache to access for content retrieval and storage. Logging-in may require a credential, such as a user identifier, password, biometric identifier, etc. At decision block 704, the method 700 determines whether a user has logged-in. By way of example, and not limitation, the determination may be based on whether the user is a valid user of the device or whether the user entered the correct log-in information (e.g., user identification and password).

If a user is not logged-in, method 700 may return to block 702 and continue to receive user log-in information until a valid user is logged-in. If, on the other hand, a valid user is logged-in, method 700 may continue to block 706 to access the cache of the logged-in user. At block 708, method 700 will receive a user selection. By way of example, and not limitation, the user selection may be to switch modes, to delete cached content, or to connect to a network for content streaming. At decision block 710, method 700 determines whether the user has selected the first mode (discussed above) or the second mode (also discussed above). If the user has selected the first mode, method 700 will once again receive a user selection at block 712. For example only, the selection received at block 712 may be the user's selection for an action to be taken by the device, such as to access email content, browse the Internet, open a word processing documents, etc. At block 714, method 700 may begin to stream the user selected content to the remote device. Additionally, and maybe in parallel, method 700 will begin storing the streaming content in a user-specific cache associated with the user logged-in to the device. At decision block 718, method 700 will determine whether the user has selected to end the first mode. By way of example, and not limitation, the user may select to end the first mode by way of any of the previously disclosed user actions. If the user has not ended the first mode, method 700 will wait for the next user selection at block 712. If, however, the user has ended the first mode, method 700 will return to decision block 704 to determine if the current user is still logged-in, either maintaining the session with the current user or again receiving user log-in information at block 702.

Returning to decision block 710, if the first mode was not selected, method 700 may begin to display the user-specific cache content associated with the logged-in user. By way of example only, the user-specific cache content may be from the user's current or previous session. Method 700 may then receive a user selection at block 722. For example only, this user selection may be based on the cached content being displayed (i.e., the user may wish to view different content than what is currently being displayed). At decision block 724, method 700 will determine whether the user has requested to end the second mode. If not, method 700 will continue to receive user instructions at block 720. If, on the other hand, the user has selected to end the second mode, method 700 may return to decision block 704 to determine if the current user is still logged-in.

Illustrative Method for Cache Content Back-Up for Remote SRC Devices

Figure 8:
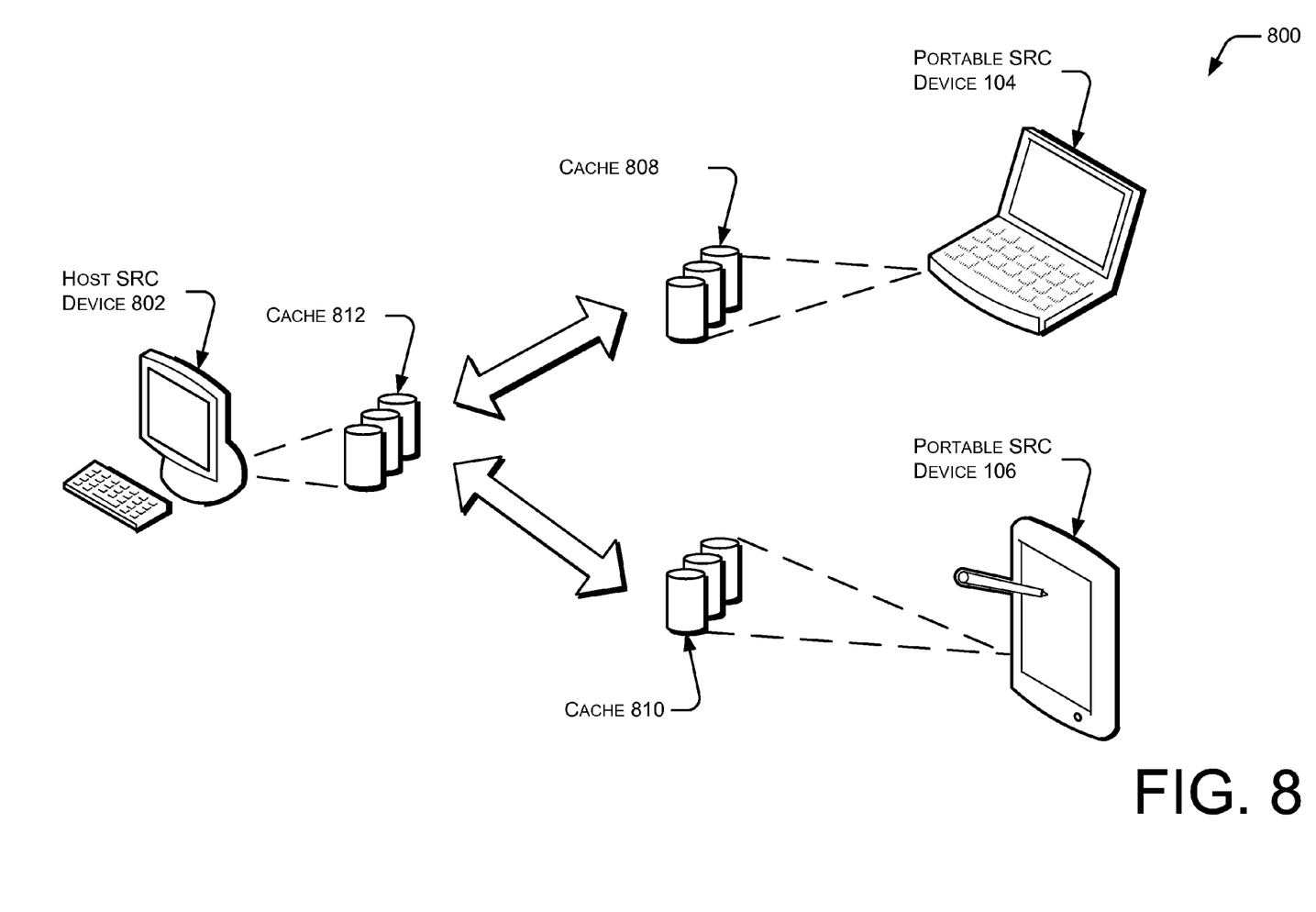
FIG. 8 is a schematic diagram of an illustrative system for multi-device, user/session cache content back-up.

FIG. 8 depicts an illustrative schematic diagram illustrating a system for multi-device, user/session cache content back-up 800. System 800 may include a host SRC device 802, and multiple remote SRC devices, such as portable SRC device 104 and portable SRC device 106. By way of example, and not limitation, each portable SRC device in back-up system 800 may contain multiple memory cache locations, such as cache 808 and cache 810. Additionally, host SRC device 802 may contain multiple memory cache locations, such as cache 812. In one aspect, both portable SRC devices 104 and 106 may be operated by a single user. In another aspect, both portable SRC devices 104 and 106 may be operated by multiple users. In yet another aspect, back-up system 800 may include three or more portable SRC devices which may be operated by one or more users. In general, back-up system 800 may be used to back-up cached content from one remote device to another remote device, saving the state or session of a previous use. In this way, a user (User, not shown) may log-off of one remote device, and log-on to another remote device without losing the cached content and/or without losing their place in the cached content.

By way of example only, in the single user scenario, User may activate portable SRC device 104 and begin streaming content from host SRC device 802. While streaming content, portable SRC device 104 may store the requested content, as well as other related content, to user/session-specific memory cache location 808. While operating device 104 in the first mode, User is able to interact with the content as if they are logged-in to host SRC device 802 and all content may be stored in cache 808. During this time, the content of cache 808 may also be transmitted to host SRC device 802 in order to save the content of the user/session in cache 812 for other devices. When, or if, User switches to the second mode, the cache content may be automatically backed-up at the host SRC device 802 by transmitting the contents of cache 812 prior to switching to the second mode. In another aspect, however, the cache content is saved locally until the next time the device switches back to the first mode.

In one aspect, when User logs-off of portable device 104, or otherwise ends the session, the cache content that was backed-up at the host SRC device 802, for example in cache 812, may be transmitted to all other devices registered with, owned by, used, or associated with User. By way of example, and not limitation, User may also be a registered user of portable SRC device 106. After the cache content of cache 808 (i.e., the data previously streamed to portable SRC device 104) has been transmitted to host SRC device 802, the content may then be streamed to portable device 106 and stored in cache 810 when device 106 is in the first mode. In this aspect, User may be able to log-in to portable SRC device 106 and seamlessly view the content that was previously being viewed on portable SRC device 104.

Figure 9:
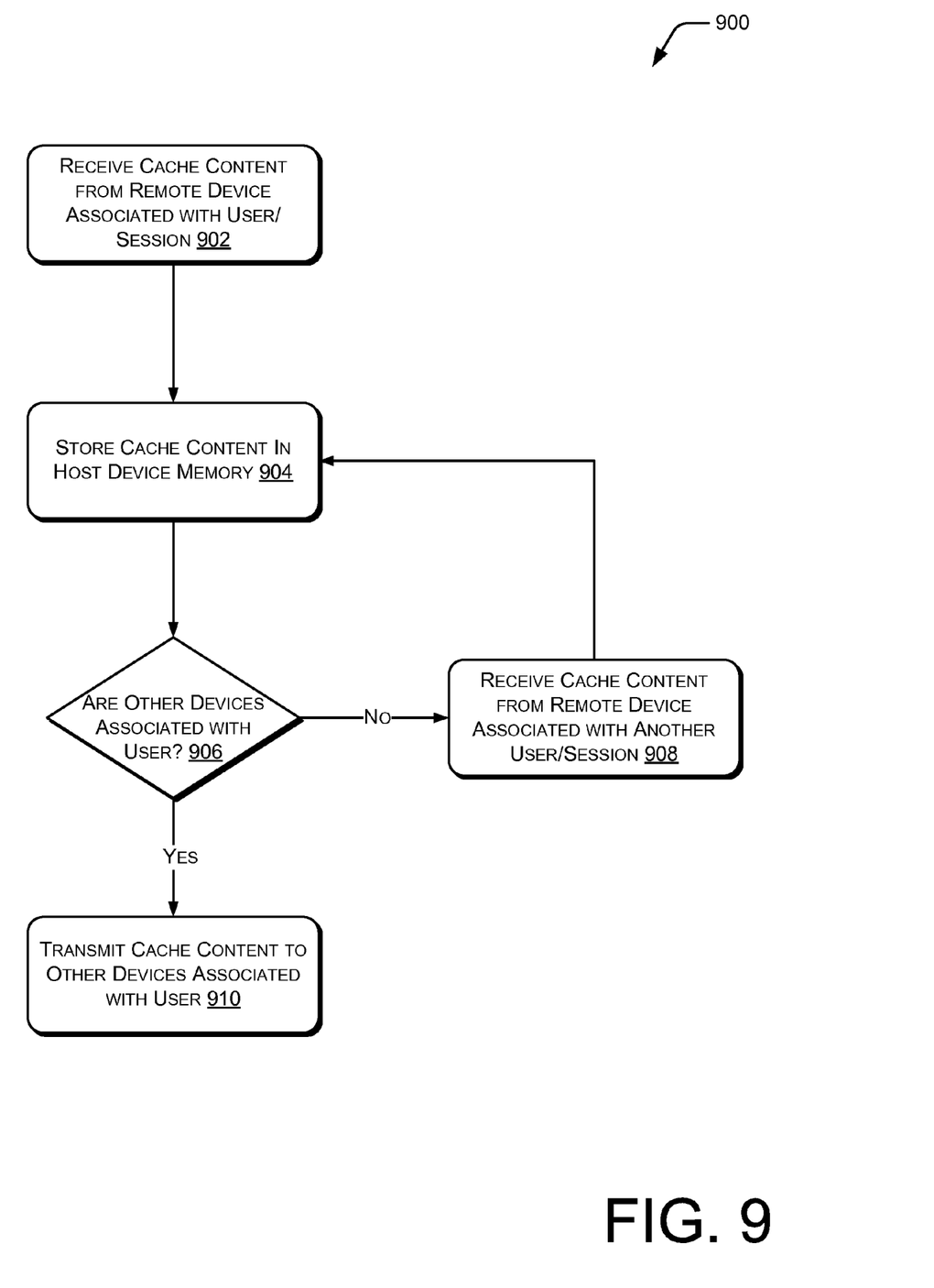
FIG. 9 is a flowchart illustrating details of an illustrative method of backing-up user content between multiple remote devices.

FIG. 9 is a flow diagram of one illustrative method 900 for backing-up user cache content between multiple remote SRC devices. As discussed above, backing-up user cache content may allow for one user to seamlessly operate multiple remote SRC devices. The method 900 may, but need not necessarily, be implemented using the dual-mode, dual-display SRC environment 100 shown in FIG. 1. In this particular implementation, the method 900 begins at block 902 in which the method 900 receives cache content from a remote SRC device associated with a user and/or a session associated with a user. By way of example only, cache content may be streamed to a host SRC device while the remote SRC device is in a full-power mode which includes use of a network interface. Both wired and/or wireless NICs may be used. Accordingly, the network connection between the SRC device may be a wired and/or wireless connection.

At block 904, method 900 will store the cache content associated with the user in the host SRC device memory. At decision block 906, method 900 will determine whether there are other devices associated with the user. If method 900 determines that no other remote SRC devices in the system are associated with the user of the most recently stored cache content, method 900 may then receive cache content from a remote SRC device associated with a different user and/or user session at block 908. Method 900 may then return to block 904 where it will store the cache content in the host SRC device memory. This time, however, it is the cache content of the new user that is being saved. If, on the other hand, method 900 determines that other devices are associated with the user whose cache content was most recently stored at the host SRC device, then method 900 may terminate by transmitting the cache content to the other devices associated with the user at block 910.

In one aspect, cache content backed-up at the host SRC device, may be saved for a pre-determined amount of time and later transmitted to new devices added to the system that are associated with the user. This way, if a user adds additional devices to the system after the cache content has been backed-up, method 900 may be able to appropriately transmit the saved content to the new devices.

FIGS. 6-9 provide simplified examples of suitable methods and devices for user-specific memory cache locations and multi-device, user/session cache content back-up. However, other configurations are also possible. For example, while three memory cache locations and two user-specific memory cache locations are shown in FIG. 6, any number of memory cache locations may be used. Further, any type of memory may be used for the user-specific memory storage as well as for the multi-device, user/session cache content back-up. Additionally, any number of portable SRC devices as well as any number of host SRC devices may be suitable as well. Moreover, as noted above regarding FIGS. 1, 2, 4, and 5, while the devices of FIGS. 6 and 8 are shown as dual-mode, dual-display SRC devices, SRC devices which are only dual-mode and SRC devices which are only dual-display may be implemented as well.

Illustrative devices, systems, and methods of a dual-mode, dual-display SRC environment are described above. Some or all of these systems and methods may, but need not, be implemented at least partially by an architecture such as that shown in FIG. 3. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

CONCLUSION

Although the disclosure uses language specific to structural features and/or methodological acts, it is to be understood that the disclosure is not limited to the specific features or acts described. Rather, the specific features and acts are disclosed as examples of implementations.

What is claimed is:

1. A computer-implemented method comprising:
   maintaining a plurality of cache locations in memory of a shared-resource device, each cache location of the plurality of cache locations storing content specific for a respective user and enabling the respective user to operate the shared-resource device independently from one or more other users; and
   transmitting one or more annotations stored in a first cache location of a first user to another device in response to the shared-resource device changing from a first mode to a second mode, wherein the first mode comprises a low-power mode and the second mode comprises a full-power mode.

2. The computer-implemented method of claim 1, further comprising:
   receiving a second credential associated with a second user;
   in response to determining an identity of the second user based on the second credential, granting access of content stored in a second cache location to the second user, the second cache location being different from the first cache location.

3. The computer-implemented method of claim 1, further comprising:
   capturing the one or more content annotations of the first user during the first mode; and
   storing the one or more content annotations in the first cache location.

4. The computer-implemented method of claim 1, wherein content stored in the first cache location comprises content previously streamed from a host device to the shared-resource device during a last session of the first user on the shared-resource device.

5. The computer-implemented method of claim 1, further comprising logging the first user in the shared-resource device in response to determining an identity of the first user based on a first credential.

6. The computer-implemented method of claim 1, further comprising enabling a presentation of content that the first user has accessed in a last session based on content stored in the first cache location.

7. The computer-implemented method of claim 1, wherein the low-power mode comprises a mode in which the shared-resource device is not connected to a network, and the full-power mode comprises a mode in which the shared-resource device is connected to the network.

8. The computer-implemented method of claim 1, further comprising:
   presenting content to the first user via a first display in the first mode; and
   presenting the content to the first user in a second display in the second mode, the second display being different from the first display.

9. A computing device comprising:
   one or more processors;
   memory storing executable instructions that, when executed by the one or more processors, cause the one or more processors to perform acts comprising:
   maintaining a plurality of cache locations in the memory, each cache location of the plurality of cache locations storing content specific for a respective user and enabling the respective user to operate the computing device independently from one or more other users; and
   transmitting one or more annotations stored in a first cache location of a first user to another device in response to the shared-resource device changing from a first mode to a second mode, wherein the first mode comprises a low-power mode and the second mode comprises a full-power mode.

10. The computing device of claim 9, the acts further comprising:
    receiving a second credential associated with a second user;
    in response to determining an identity of the second user based on the second credential, granting access of content stored in a second cache location to the second user, the second cache location being different from the first cache location.

11. The computing device of claim 9, the acts further comprising:
    capturing the one or more content annotations of the first user during the first mode; and
    storing the one or more content annotations in the first cache location.

12. The computing device of claim 9, the acts further comprising:
    logging the first user in the computing device in response to determining an identity of the first user based on a first credential; and
    enabling a presentation of content that the first user has accessed in a last session based on content stored in the first cache location.

13. The computing device of claim 9, wherein the low-power mode comprises a mode in which the computing device is not connected to a network, and the full-power mode comprises a mode in which the computing device is connected to the network.

14. The computing device of claim 9, further comprising a first display and a second display which is different from the first display, wherein the acts further comprise presenting content to the first user via the first display in the first mode and presenting the content to the first user in the second display in the second mode.

15. One or more computer storage media storing executable instructions that, when executed by one or more processors, cause the one or more processors to perform acts comprising:
   maintaining a plurality of cache locations in memory of a shared-resource device, each cache location of the plurality of cache locations storing content specific for a respective user and enabling the respective user to operate the shared-resource device independently from one or more other users; and
   transmitting one or more annotations stored in a first cache location of a first user to another device in response to the shared-resource device changing from a first mode to a second mode, wherein the first mode comprises a low-power mode and the second mode comprises a full-power mode.

16. The one or more computer storage media of claim 15, the acts further comprising:
   receiving a credential associated with a second user;
   in response to determining an identity of the second user based on the credential, granting access of content stored in a second cache location to the second user, the second cache location being different from the first cache location.

17. The one or more computer storage media of claim 15, the acts further comprising:
   capturing the one or more content annotations of the first user during the first mode; and
   storing the one or more content annotations in the first cache location.

18. The one or more computer storage media of claim 15, wherein content stored in the first cache location comprises content previously streamed from a host device to the shared-resource device during a last session of the first user on the shared-resource device.

19. The one or more computer storage media of claim 15, the acts further comprising logging the first user in the shared-resource device in response to determining an identity of the first user based on a credential associated with the first user.

20. The one or more computer storage media of claim 15, the acts further comprising enabling a presentation of content that the first user has accessed in a last session based on content stored in the first cache location.

* * * * *